Patented Jan. 6, 1931

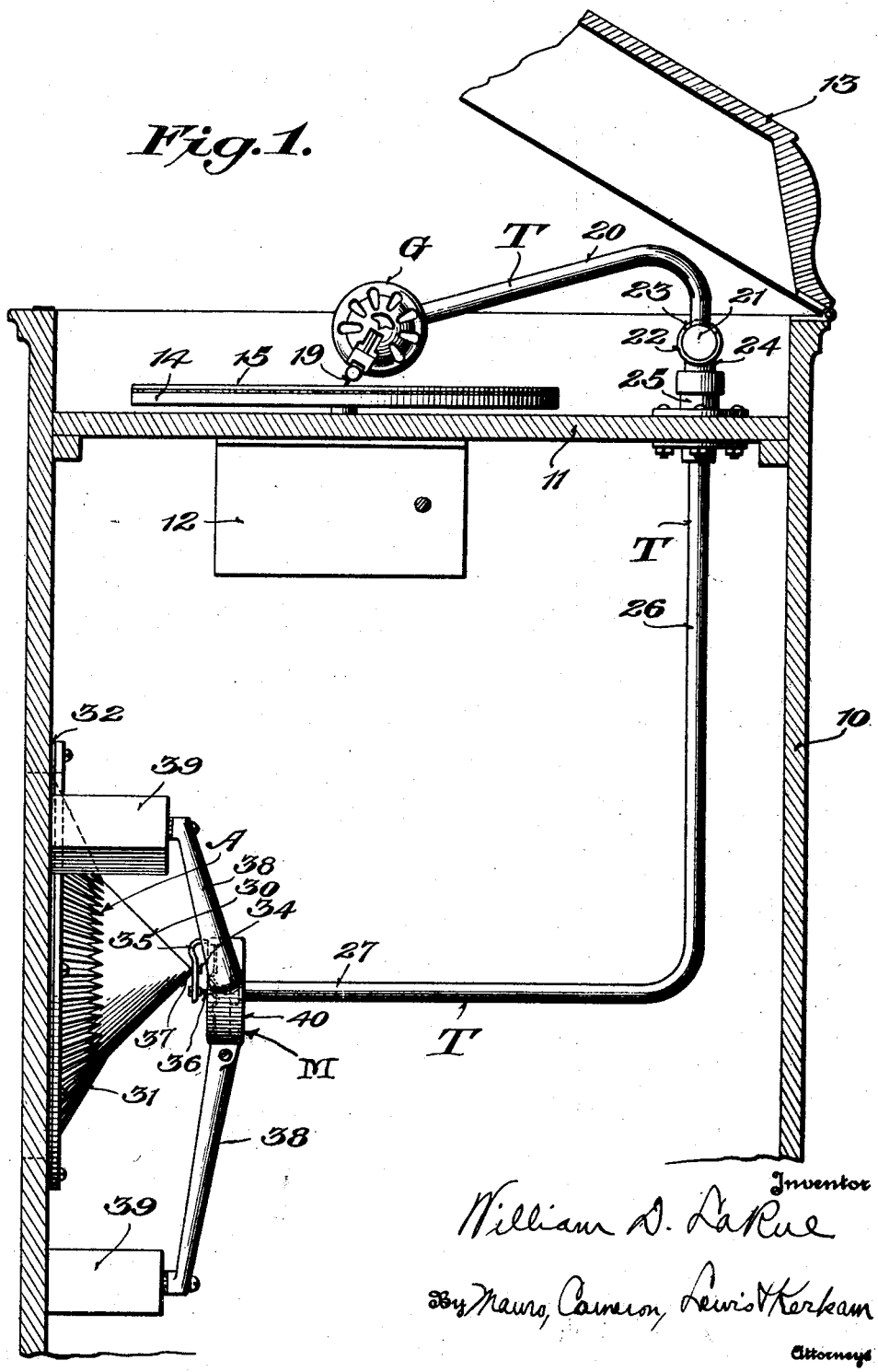

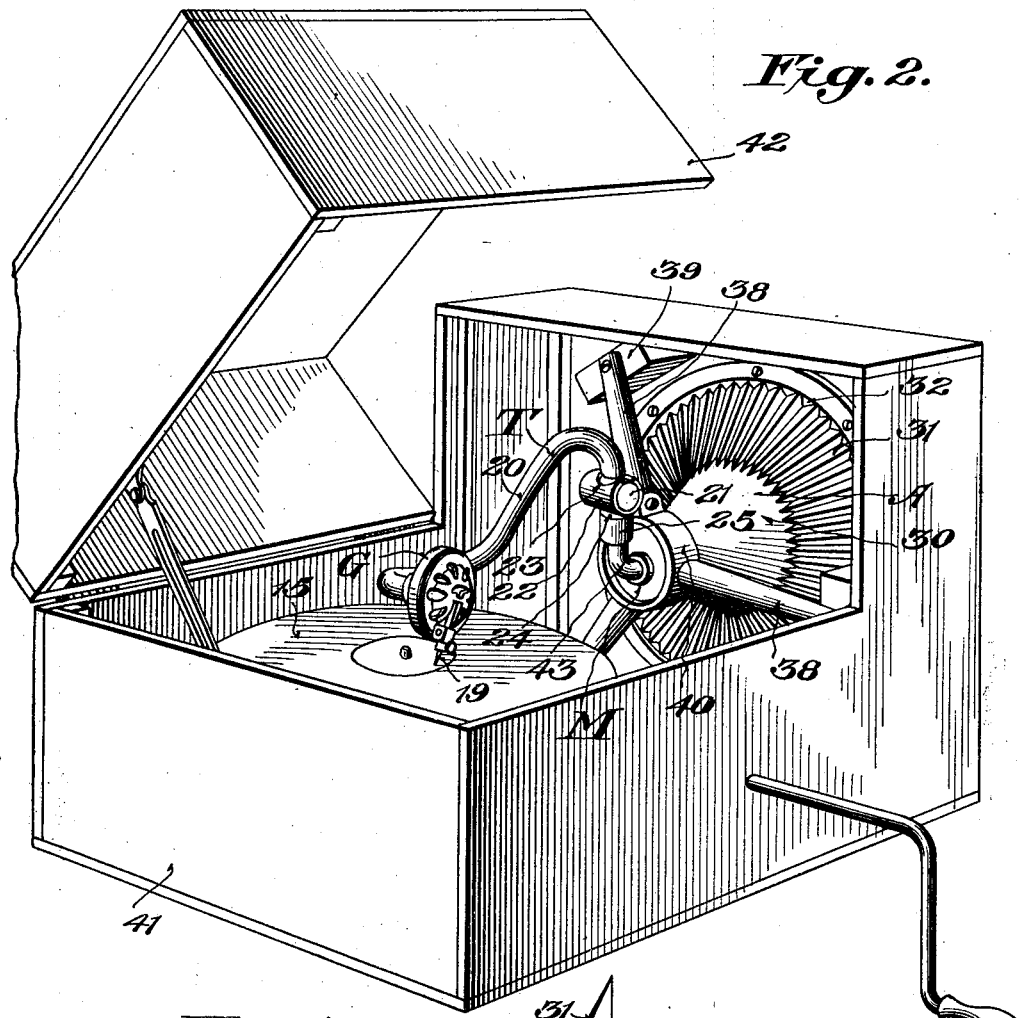

1,787,911

UNITED STATES PATENT OFFICE

WILLIAM D. LA RUE, OF PHILADELPHIA, PENNSYLVANIA, ASSIGNOR TO VICTOR TALKING MACHINE COMPANY, A CORPORATION OF NEW JERSEY

SOUND-REPRODUCING MECHANISM

Application filed May 1, 1926. Serial No. 106,073.

This invention relates to mechanism for converting mechanical vibrations into acoustical vibrations, and particularly to mechanism of this character for use in sound reproducing machines, but while the invention will be hereinafter described in connection with its embodiment in devices for reproducing sound from sound records of any suitable character, it is to be expressly understood that the invention is not restricted thereto, as it is susceptible of embodiment in devices for generating amplified sound waves where the source of vibrations to be converted into acoustical waves is other than a record of sound.

Heretofore, sound reproducing machines have generally employed some form of horn for amplifying the sound generated by the vibration of a diaphragm that is operated by a stylus cooperating with a record trace. But a horn, even of simple character, introduces many complexities and difficulties into the securing of faithful sound reproduction, because of the acoustical laws underlying the operation of a confined body of air in transmitting and amplifying sound, while the necessity of so shaping the horn that it may have the proper length and cross sectional size while confining it within the space of a commercially practicable structure has greatly increased these complexities and difficulties.

It has heretofore been proposed to avoid the use of a horn by reproducing the sound directly from a diaphragm of such area that the volume of air placed in vibration will give the desired volume of sound, but proposals of this character have introduced other complexities and difficulties that have rendered them impracticable for the most part. If a large diaphragm is so mounted that it is closely adjacent to the stylus and moves therewith over the record tablet, the burden imposed on the stylus of both vibrating such a diaphragm and feeding it relatively to the record tablet has not only tended to wear the record trace very rapidly, but has also introduced other difficulties and problems which have militated against faithful sound reproduction. If the diaphragm is mounted at a distance from the stylus so as to take the burden off of the stylus, the introduction of a sufficiently rigid mechanism between the stylus and the diaphragm to transmit the vibrations from the stylus to the diaphragm with undiminished amplitude and power has introduced grave difficulties and problems because of the added weight, the inertia effects of the relatively-heavy vibrating parts, the natural periods of vibration of the elements, etc.

It is an object of this invention to provide a method and apparatus for reproducing sound vibrations which avoid the necessity of a horn and which enable the use of a large diaphragm without introducing the difficulties heretofore encountered whether the diaphragm be positioned close to or remote from the stylus.

It has also been proposed heretofore to transmit the vibrations generated by a stylus cooperating with a record trace to a point relatively remote from said stylus by means of an interposed column of fluid. Devices of this character heretofore proposed, however, have generally employed a liquid as the medium for transmitting the pressures generated by the vibration of the diaphragm, and devices of this character have proven neither feasible nor satisfactory for a variety of reasons, among which may be noted the difficulty in maintaining fluid-tight joints, particularly in constructions which must provide for relative movement between the stylus and the record trace; the weight of a relatively long column of liquid and the attendant increased pressure and wear on the record trace; the relative rigidity of a column of liquid owing to its incompressible character, so that the diaphragm at the remote end of the column may react on the diaphragm at the stylus end of the column in substantially the same way as if a rigid bar extended between the two diaphragms. Some efforts have also been made to use a column of gaseous fluid for transmitting pressures from a stylus-operated diaphragm to a diaphragm relatively remote therefrom. But in none of the structures heretofore proposed has the principle of transmitting the variable pressures and converting them into acoustic vibrations been such as to enable an efficient and faithful transmission of the vibrations under conditions which permit a desired volume of sound to be generated from a relatively large diaphragm without the use of an amplifier operating upon the horn or megaphone principle.

It is an object of this invention to provide a method and apparatus for transmitting sound vibrations by a fluid column to a distance from the source of vibrations while avoiding the various difficulties incident to the use of a liquid column.

Another object of this invention is to provide a method and apparatus for reproducing sound vibrations by use of a fluid column which are adapted to effect a faithful and efficient transmission of vibrations in conformity with sound waves under such conditions that the transmitted vibrations may be converted into audible sound waves of the desired volume by a relatively large diaphragm without the necessity for a horn.

Another object of this invention is to provide a method and apparatus for reproducing sound vibrations whereby sounds of the desired volume may be radiated from a large diaphragm at any suitable distance from the source of vibrations without substantial loss of energy and without substantial distortion of the vibrations in the transmission of the vibrations to said diaphragm.

Another object of this invention is to provide a method and apparatus for reproducing sound vibrations whereby a large diaphragm positioned relatively remote from the source of vibrations may be effective in faithfully reproducing sounds of low periodicity as well as sounds of higher periodicity.

Another object of this invention is to provide a method and apparatus for reproducing sound vibrations whereby the sound vibrations may be radiated from a relatively large diaphragm at a distance from the source of vibrations without introducing deleterious effects arising from the natural periods of vibrations of the sound transmitting elements.

Another object of this invention is to provide a method and apparatus for reproducing sound vibrations whereby a large diaphragm may be positioned at a distance from the source of vibrations without introducing the inertia effects of relatively heavy or relatively stiff sound transmitting elements.

Another object of this invention is to provide a method and apparatus for reproducing sound vibrations whereby a relatively large diaphragm may be used without substantial distortion of the sound waves by reason of the weight or ineritia of such diaphragm.

Another object of this invention is to provide an apparatus for reproducing sound vibrations of the character referred to which is of simple and rugged construction so that it is practicable for commercial production and not likely to get out of repair under the conditions of normal use of such machines.

Other objects will appear as the description of the invention proceeds.

The invention is capable of being carried out in a variety of ways and of being embodied in a variety of apparatus, two being shown on the accompanying drawings, but it is to be expressly understood that the drawings are for purposes of illustration only, and are not to be construed as a definition of the limits of the invention, reference being had to the appended claims for that purpose.

Referring in detail to the drawings wherein the same reference characters are employed to designate corresponding parts in the several figures:

Fig. 1 is a more or less diagrammatic view illustrating, in vertical section, a sound reproducing machine of the cabinet type embodying the present invention;

Fig. 2 is a perspective view of a sound reproducing machine, of the type adapted to rest upon a table, also embodying the present invention; and Fig. 3 is a diagrammatic view illustrating the component elements of sound reproducing apparatus embodying the present invention.

The method of the present invention involves three major steps:

The generation of variable pressures in conformity with sound vibrations, preferably by means of a diaphragm mechanically or otherwise placed in vibration; the transmission of the variable pressures, by a fluid column, without substantial change in amplitude, to a second vibratory element, which is preferably a diaphragm of substantially the same size as the first diaphragm; and the transmission of the vibrations thereby induced in said second vibratory element to a diaphragm of a size and character adapted to produce sounds of the desired volume, the transmission of vibrations to the latter diaphragm being such as to set into vibration a relatively large body of air without substantial distortion or loss of energy.

A suitable apparatus for carrying out the method of the present invention is diagrammatically illustrated in Fig. 3 and, as here shown, said apparatus is composed of four major elements:

The generator G of the variable pressures, the fluid column T for transmitting the generated pressures, the motor M for converting the transmitted pressures into mechanical vibrations, and the amplifier A for converting the mechanical vibrations of the motor into the acoustical vibrations of a relatively large volume of air.

The generator G may be of any suitable construction for converting mechanical vibrations of suitable amplitude, having the periodicities of the sound waves to be reproduced, into changes of pressure in a fluid column. Said generator preferably employs a diaphragm, which may be of any suitable size and character and vibrated in any suitable way, and where the invention is embodied in a sound reproducing, or so-called talking machine, the diaphragm of the pressure generator receives its vibrations from a stylus in contact with the undulations of a suitable record trace between which and the stylus relative movement is effected in any suitable way. The power of the motor effecting relative movement between the record trace and the stylus is then the source of power for creating the changes of pressure by vibration of the diaphragm, and the periodicity and amplitude of such vibrations are determined by the characteristics of the record trace.

The stylus and stylus lever should be so mounted and constructed that the power derived from the relative movement between the record trace and the stylus is transmitted to the diaphragm without substantial loss of energy; that is the vibrations imparted to the stylus and stylus lever should be transmitted to the diaphragm without substantial lost motion or flexure of the parts. Also the stylus lever should be so connected to the diaphragm and the diaphragm should be of such size and character of construction that the vibrations transmitted thereto by the stylus and stylus lever are received and converted into changes of pressure in the fluid column engaging the face of the diaphragm without substantial lost motion or loss of energy.

The transmitting element T is a tubular element which provides a column of fluid, preferably of substantially uniform section throughout. Said column may be of any suitable length in order to transmit the pressure variations created at the generator to a point in proximity to the desired location of the amplifier hereinafter described, and said column may be of any suitable cross sectional size and shape. The fluid employed is preferably a gas, and the gas used may be of different kinds and of different pressures, but I prefer to use air at substantially atmospheric pressure, because of the simplicity of construction, since a leakage between the interior and exterior of such a column is not accompanied by any loss of pressure or change of gaseous medium to interfere with the designed operation of the device. It is to be expressly understood, however, that other gases than air may be used if desired, and the gas employed, whether air or otherwise, may be at other than atmospheric pressure if it is desired to take advantage of the characteristics of a column of gaseous fluid of other desired pressures.

The tubular wall containing the pressure-transmitting fluid may be of any suitable cross sectional size and configuration, and be composed of any suitable material, such as metal or glass. As this tubular pressure-transmitting element possesses some of the characteristics of a resonant tube, with a tendency to accentuate certain periodicities having a definite relation between their wave lengths and the length of the tube, said tube, if desired, may be provided with bends so as to render the responsiveness of the system to the different periodicities more nearly uniform. By providing bends in the tube at suitable locations, which form shorter columns of fluid within the length of the tube, certain periodicities can be strengthened, and thereby undue variations in the accentuation of particular frequencies be avoided.

At its opposite end, said transmitting element T communicates with a motor element M, which may be of any suitable size, shape and construction. The end of the fluid column at the motor is closed by a vibratory element, preferably a diaphragm of substantially the same size as the diaphragm of generator G. The variations of pressure transmitted through the column of gaseous fluid are thereby delivered to the diaphragm of the motor M and the latter is set into vibrations of substantially the same periodicity and amplitude as the vibrations of the diaphragm of generator G.

From the motor M the vibrations are transmitted to the diaphragm of the amplifier A. This diaphragm is preferably relatively large in size, on the order of eight to ten inches in diameter, so that its superficial area will be sufficient to set into vibration a relatively large volume of air. This diaphragm is preferably so constructed and mounted that it will vibrate bodily or like a piston, particularly for the lower frequencies, and to this end is so constructed as to be relatively stiff and light, and is so mounted as to offer a minimum opposition to rectilinear movement of the diaphragm as a body.

The vibrations of the diaphragm of the motor M are transmitted to the diaphragm of the amplifier A by a lever, preferably of the second order, the arms of which are so proportioned as to suitably balance the output impedance with the sound box impedance, and the load to the available driving pressure. The variations of pressure thus transmitted to the diaphragm of the motor are converted into changes of pressure in the body of air in contact with the relatively large area of the amplifier diaphragm under conditions which most efficiently set the body of air in contact with the large amplifier diaphragm into vibration with a periodicity in conformity with the periodicity of the vibrations transmitted to the generator diaphragm and with a decreased amplitude and increased force which is properly proportioned to the load on the amplifier diaphragm, the latter diaphragm, owing to the relatively large volume of air which is set into vibration thereby, reproducing the sound with the desired volume.

Apparatus for carrying out the method and embodying the elements and principle of operation of the present invention, as diagrammatically illustrated in Fig. 3 and above described, may be embodied in sound reproducing machines of a wide variety of constructions, two of which are illustrated in Figs. 1 and 2, but it is to be expressly understood that these two figures are intended to illustrate only two of the many constructions which may be employed.

In Fig. 1 the invention is shown as embodied in a sound reproducing or talking machine of the cabinet type which is designed to rest upon the floor. A cabinet 10 of any suitable size, shape, material and construction is shown as provided with a motor board 11 from which is supported a suitable motor 12. A hinged cover 13 of any suitable character is illustrated for closing the top of the cabinet. Above the motor board 11 a rotatable record support 14 of any suitable construction is designed to carry a record tablet 15 of any suitable character. The reproducing apparatus is illustrated as of that type which is designed to cooperate with a laterally undulating record trace, but it is to be expressly understood that the invention can be embodied with equal facility in structures designed to reproduce other types of record traces.

Mounted for cooperation with the record tablet 15 is the generator G which, as shown in Fig. 3, may be a sound box of the type and character heretofore employed for the reproduction of sound records. The casing 16 of said sound box, of any suitable size, shape, construction and material, contains a diaphragm 17 suitably mounted at its periphery and connected, at or adjacent its center, to a stylus bar 18, which is mounted in any suitable way for oscillatory movement. Said stylus bar is designed to carry a suitable needle or stylus 19 for tracking the record trace and converting, with a minimum of lost motion and flexure, the undulations of said trace into vibratory movement of the diaphragm 17.

Said diaphragm 17 may be of any suitable size, shape, material and construction. I prefer to employ a diaphragm on the order of two and one-half inches in diameter and provided with concentric, centrally-arranged circular corrugations to give stiffness to the central portion of the diaphragm, the diaphragm being so constructed at or adjacent to its periphery as to render the same marginally flexible, so that the diaphragm will approximate a piston in the character of its oscillatory movement.

Communicating with the space at the rear of the diaphragm, through the usual opening in the rear of the sound box, is the transmission tube T, of any suitable material, such as glass or metal, and having its bore preferably of uniform cross section. While the cross sectional size of said tube may vary within considerable limits, and may be varied with changes in size of the cooperating elements, I have found that a tube on the order of a half-inch in diameter gives very satisfactory results in the machine illustrated. Said transmission tube T is of such length and so shaped as to extend to the desired location of the relatively large or amplifying diaphragm A which, in the form shown in Fig. 1, is disposed in the front wall of the cabinet 10 below the plane of the motor board 11. As shown said transmission tube T extends rearwardly from the generator G for a length greater than the radius of the table 14 where it is bent through approximately a right angle and extends downwardly through the motor board 11 to approximately the vertical height of the center of the diaphragm, where it is again bent at approximately a right angle and extends horizontally to the motor M.

In order to provide for the relative movement between the generator G and the record tablet 15 a joint is preferably interposed in the length of said tube T, this joint in the form shown providing both for the traverse of the generator G across the record tablet 15 and also for the rise and fall of the generator G with respect to the plane of the record tablet 15. The joint interposed for these purposes may be of any suitable construction. In the form shown the first section 20 of the transmitter tube T is suitably connected to a generally-cylindrical horizontally-disposed member 21 which is mounted for oscillatory movement in vertical planes in a cylindrical member 22 provided with a circumferentially extending slot 23 through which the tube 20 passes. Said slot 23 is of such length as to provide the desired extent of movement of the generator G in vertical planes. Said cylindrical member 22 has a vertically depending tubular extension 24 which is mounted in any suitable way to swivel about a vertical axis within an upstanding vertical tubular bracket 25 suitably attached to the motor board 11. The interior passages to and through said tubular extension 24 and tubular bracket 25 communicate with the vertical leg 26 of the transmission tube T extending below the motor board 11, the latter, as heretofore pointed out, communicating with a horizontal leg 27 of said tube which leads to the motor M.

The joint provided by the elements 21, 22, 23, 24, 25, therefore enables the generator G to swing radially across the record tablet 15 from one extremity of the record trace to the other, and also have the desired extent of movement in vertical planes. The passage through the joint elements is preferably of such size as to constitute substantially no obstruction or enlargement of the passage through the remaining sections of the transmission tube T.

The motor M, with which the extremity of the transmission tube T communicates, includes a casing 28, of any suitable size, shape, construction and material, within which is mounted, in any suitable way, a diaphragm 29, of any suitable shape, size, construction and material, but preferably having substantially the same area exposed to the fluid within the sound box casing as that of the diaphragm 17. As a matter of fact the diaphragm 29 may be, and preferably is, an exact duplicate of the diaphragm 17.

Mounted within or opposite to an aperture of suitable size and shape in the front wall of the cabinet 10, which opening may be closed by one or more doors, grills, shutters or any other suitable sound controlling or modifying elements, is the relatively large amplifier diaphragm A, which also may be of any suitable size, material, shape and construction. I preferably construct this diaphragm of fibrous material, on the order of eight to ten inches in diameter, and in the manner disclosed and claimed in my application Serial No. 130,662, filed August 21, 1926, and entitled Diaphragms. As illustrated, said diaphragm is composed of a relatively stiff conical central portion 30, having its projected radius approximately one-half the projected radius of the vibratory portion of the entire diaphragm. This conical central portion possesses the advantage of giving maximum rigidity with minimum weight. The conical central portion is connected in any suitable way to a corrugated or pleated annular section 31 which at its periphery is suitably attached to a peripheral ring 32 of highly flexible material by which said diaphragm may be mounted and which affords a minimum of resistance to the rectilinear or vibratory movement of the diaphragm proper. A diaphragm constructed and mounted in the manner just referred to is designed to vibrate as a whole, or to have a piston-like movement, particularly at the lower frequencies.

Interposed between the diaphragm 29 of the motor M and the diaphragm 30, 31 of the amplifier A is a suitable mechanical connection for transmitting the vibratory movements of diaphragm 29 to the diaphragm of said amplifier. This mechanical connection preferably takes the form of a lever and I prefer to use a lever of the second order. This lever, 34, may be of any suitable construction, but is preferably relatively inflexible. Said lever is suitably mounted on the casing 28 to provide for its oscillatory movement, being shown as provided with a leaf spring extension 35 which is suitably attached to the casing 28. At its outer extremity lever 34 is connected to the diaphragm 29, centrally of the latter, by a suitable connecting element 36, and intermediate its length said lever 34 is connected to the center of the cone 30 by a suitable connecting element 37. The distance of the connecting element 37 from the fulcrum 35 of said lever 34 is so proportioned to the distance of the connecting element 36 from said fulcrum 35 that the load on the diaphragm is properly balanced with the driving pressures transmitted thereto through the system heretofore described or, in other words, so as to balance the output impedance of the amplifier diaphragm with the input impedance of the generator G. The amplitude of motion imparted to the amplifier diaphragm from the motor diaphragm is thus decreased, but the total pressure or force acting on the amplifier diaphragm is proportionately increased, so that the amplifier is able to set into vibration a relatively large volume of air which is capable of producing the desired volume of sound without further amplification.

The motor M is supported in operative relation to the amplifier A in any suitable way. In the form shown a spider or bracket composed of a plurality of arms 38 is suitably mounted, at the extremities of its arms, on posts or blocks 39 around the opening for the amplifier A, and said bracket at its central portion is provided with a generally circular housing 40 which receives the motor M or constitutes the casing for the motor diaphragm 29.

In the embodiment of the invention shown in Fig. 2 the casing 41 for the sound reproducing machine is of smaller size, being of the character generally employed for machines designed to rest on a table or other convenient support, and is provided with a suitable cover 42 for gaining access to the sound reproducing mechanism within the same. As in the embodiment of Fig. 1 the generator G communicates through a long tube T with a motor M which is connected to an amplifier A, in this embodiment mounted in a vertical wall of the cabinet extending above the motor board. The sound generating, transmitting and amplifying mechanism of this embodiment includes the same elements as the embodiment of Fig. 1, similar parts being indicated by the same reference character. The transmitter tube T is of less length than in Fig. 1, a short right angular section 43 being interposed between the joint elements 21, 22, 23, 24, 25, and the motor M.

In operation, the generator G traverses the record tablet 15 and the stylus 19 is vibrated by the undulations of the record trace. The vibrations of said stylus are transmitted through the stylus lever 18 to the diaphragm 17, the vibrations of said diaphragm being converted into changes of pressure in the fluid column which is in contact with the rear of the diaphragm 17. The changes of pressure thus generated in the fluid column are transmitted by the latter through the length of transmission tube T, and inasmuch as said tube is of substantially uniform cross section throughout, these changes of pressure are transmitted, without any substantial change of periodicity or amplitude, to the motor diaphragm 29. The motor diaphragm 29 is set into vibration by the changes in pressure transmitted through the tube T, and as in the preferred embodiment said diaphragm 29 is of the same effective area as the diaphragm 17, the vibrations of the diaphragm 29 are of substantially the same periodicity and amplitude as the vibrations of the diaphragm 17. The vibrations of diaphragm 29 are then transmitted to the relatively large amplifier diaphragm A, and where the connection between said diaphragms is of the preferred construction described and illustrated, the vibrations of the diaphragm 29 are transmitted to the amplifier diaphragm without lost motion, but with decreased amplitude and increased force, so that said amplifier diaphragm sets a relatively large volume of air in contact therewith into vibratory movement with the same periodicity as diaphragm 17 but with a force and amplitude that may efficiently set a relatively large volume of air into vibratory movement without substantial distortion of the transmitted vibrations. Therefore, said diaphragm is capable of producing acoustic vibrations of the desired amplitude without further amplification by the use of a horn or other mechanism, the radiated vibrations being accurate and faithful reproductions of the sounds recorded in the undulations of the record trace.

It will therefore be perceived that I have provided a sound reproducing machine which is adapted to reproduce sound with the desired volume from a relatively large diaphragm without introducing the difficulties heretofore experienced with the use of large diaphragms, without imposing any undue burden or wear upon the reproducing stylus and record trace, and without the use of transmission mechanism whose weight or inertia or vibratory periods are calculated to interfere with the accuracy and efficiency of the transmission of the vibrations. At the same time the transmission of vibrations by variations of pressure in a fluid column has been utilized without introducing the difficulties incident to the use of a column of liquid. By using air at atmospheric pressure, as in the preferred embodiment, the weight of the movable parts can be maintained at a suitable value and, at the same time, expensive construction has been avoided because it is not essential that the fluid column be hermetically sealed—since any slight leakage between the fluid column and the surrounding atmosphere is of little importance in view of the fact that the fluid surrounding the column is the same as that of the column, while they are both at the same normal pressure. The use of a gaseous fluid has the further advantage that a column of gas is relatively compressible and elastic and is capable of absorbing more or less of the reflex action which the large amplifier diaphragm may at times tend to produce. For example, a sustained note of approximately the natural period of the amplifier diaphragm may cause said diaphragm, owing to its inertia, to react on the reproducing instrumentalities cooperating with the record trace and produce what is known as a blast, if the large diaphragm is rigidly connected to the reproducing instrumentalities, either through mechanical connections or through a relatively rigid body of liquid. In a structure built in conformity with the present invention, however, the elasticity and relative compressibility of the column of gas enables any such tendency produced by the amplifier diaphragm to be absorbed within the transmitting column, and the production of blasts is thus minimized if not entirely eliminated.

Moreover, it will be perceived that a method and apparatus have been provided whereby sounds of the desired volume may be radiated without the use of a horn or sound amplifying mechanism other than a relatively large diaphragm and that owing to the manner in which the vibrations are transmitted to said diaphragm, the sounds radiated from said diaphragm are faithful and accurate reproductions of the sound recorded by the record trace. This method and apparatus for transmitting the sound vibrations enables the relatively large diaphragm to be positioned at any suitable distance remote from the instrumentalities for tracking the record trace without introducing inertia effects of relatively heavy or relatively stiff sound transmitting elements or the deleterious effects arising from the natural periods of vibration of such sound transmitting elements. The large diaphragm faithfully reproduces sounds of low periodicity as well as sounds of higher periodicities. The apparatus is also of simple and rugged construction that is practicable for commercial production, is not likely to get out of repair under the conditions of normal use, while it is of a character which can be embodied in machines of present commercial sizes and readily adapted to various sizes and styles of constructions.

It is to be understood that the sizes and shapes illustrated are only exemplary, as changes may be made within considerable limits in the size or proportioning of parts without departing from the spirit of the present invention. The total power which can be generated is determined by the record trace having undulations of predetermined amplitude and the speed at which said record trace moves past the reproducing stylus. The load is determined by the large diaphragm of predetermined area and weight which is subjected to a predetermined pressure. As the power available is varied by different speeds of rotation or by different amplitudes of record trace, there is more or less power which can be put to work and therefore the load which can be moved, that is the size and character of diaphragm, will vary with the variations in the source of power. Such variations will be accompanied by variations in the sizes and proportions of the parts of the transmission system.

The length and shape of the fluid column may be varied within very wide limits depending upon the desired location of the amplifying diaphragm with respect to the record tracking instrumentalities and the size and character of the machine as a whole. I have found it desirable to introduce bends into this fluid column and to so position said bends as to tend to smooth out the response curve of the transmission system. As heretofore pointed out the transmission tube T partakes of some of the characteristics of a resonant tube, so that certain periodicities are accentuated to a greater extent than other periodicities. I have found that by determining the characteristics of the system without bends and noting the irregularities in the curve of intensities of sound at various periodicities, the major irregularities in said curve may be smoothed out by so positioning the bends as to accentuate periodicities which tend to be weak or to weaken periodicities which tend to be over-strong. Each bend in the tube provides a reflecting surface so that a fluid column is formed from the bend and having a natural periodicity of its own. By making these columns measured from the bends of lengths suitable to accentuate given periodicities it becomes possible to strengthen given periodicities and make the responsiveness of the system more nearly uniform.

The character of the lever employed between the motor diaphragm and the amplifier diaphragm may be varied, and the proportioning of the arms of said lever will vary with changes in the design of the machine. The arms of this lever should be so proportioned that taking into consideration the power derivable from the actuation of the record tracking instrumentalities and the load or resistance to vibration existing at the relatively large diaphragm owing to its area, the amplitude of vibration is so decreased and the force for moving the relatively large diaphragm is so increased that the latter diaphragm is efficiently set into vibration without substantial distortion to produce sounds of the desired volume with faithfulness and efficiency. I have found that by use of the present invention the power derivable from the standard talking machine record, when rotating at the speed now conventionally used, is capable of setting a diaphragm on the order of nine inches in diameter into vibration so as to produce sounds of substantially the same volume as that produced by standard machines but without the use of a horn or other amplifier. I prefer to use a lever of substantially the character illustrated on the drawing, but the proportion of the arms of said lever will vary with the size and character of the diaphragms, and for any given design it is desirable to ascertain the point of connection of said lever to the amplifier diaphragm which produces the most pleasing effects, that is gives the most faithful reproduction of sound of the different periodicities usually reproduced from talking machine records at a volume which is sufficient to meet the needs of a machine of this character.

While the embodiments of the invention illustrated on the drawing have been described with considerable particularity it is to be expressly understood that the invention is not limited thereto, as the same is capable of receiving a variety of expressions, some of which will now readily suggest themselves to those skilled in the art, while changes may be made in the details of construction, arrangement and proportion of parts, and certain features used without other features without departing from the spirit of this invention.

While it is preferred to employ a gaseous fluid as the transmitting medium, some of the advantages of the invention can be obtained with liquid as the transmitting medium, but as this requires a generator, transmitting element and motor that are fluid-tight, as well as involves other disadvantages inherent in the use of a liquid, the use of a fluid column of gas, preferably air, is preferable for reasons heretofore pointed out.

Reference is therefore to be had to the appended claims for a definition of the limits of the invention. In said claims the expression "sound waves of relatively large volume" is employed to mean sound waves of the volume usually produced by sound reproducing machines by the employment of a horn or other amplifying mechanism, and the expression "relatively large diaphragm" is used to mean a diaphragm of a size on the order of that appropriate for generating sound of the desired volume without the necessity of use of supplemental amplifying means.

What is claimed is:—

1. The method of generating sound waves of relatively large volume which includes producing variations of fluid pressure in conformity with the periodicities of the sound waves to be reproduced, transmitting said variations of pressure to a motor wherein said changes of pressure are converted into mechanical vibrations, and mechanically transmitting the converted vibrations to a relatively large diaphragm adapted to generate sound waves of the desired volume without further amplification.

2. The method of generating sound waves of relatively large volume which includes vibrating a diaphragm in conformity with the periodicities of the sound waves to be reproduced, creating changes of pressure in a column of gaseous fluid by the vibration of said diaphragm, transmitting said generated pressures to a second diaphragm, and mechanically transmitting the vibrations induced in said second diaphragm to a diaphragm of relatively large area.

3. The method of generating sound waves of relatively large volume which includes vibrating a diaphragm to create variations of pressure in a fluid column in contact therewith, transmitting said changes of pressure in said fluid column to a second diaphragm to produce therein vibrations of substantially the same periodicity and amplitude as those of the first diaphragm, and converting the vibrations of said second diaphragm into vibrations of the same periodicity but of different amplitude in a relatively large diaphragm.

4. The method of generating sound waves of relatively large volume which includes creating in a relatively long column of gaseous fluid changes of pressure in conformity with the periodicities of the sound waves to be reproduced, transmitting said changes of pressure without substantial change in amplitude to a motor element, and transmitting the vibrations thereby produced in said motor element to a relatively large diaphragm.

5. The method of generating sound waves of relatively large volume which includes vibrating a diaphragm in conformity with the sound waves to be reproduced, transmitting changes of pressure of substantially the same frequency and amplitude as the vibrations of said diaphragm through a relatively long column of gaseous fluid, converting the transmitted changes of pressure into mechanical vibrations of substantially the same periodicity and amplitude as those of the first diaphragm, and transmitting said mechanical vibrations with the same periodicity but of a different amplitude to a relatively large diaphragm.

6. The method of generating sound waves of relatively large volume which includes vibrating a diaphragm in conformity with the sound waves to be reproduced, converting the vibrations of said diaphragm into changes of pressure in a relatively long column of gaseous fluid, converting the changes of pressure transmitted by said fluid column into mechanical vibrations of substantially the same amplitude and periodicity as those of the first diaphragm, and mechanically transferring said last-named vibrations to a relatively large diaphragm.

7. The method of generating sound waves of relatively large volume which includes vibrating a diaphragm in conformity with the sound waves to be reproduced, converting said vibrations into changes of pressure in a relatively long column of gaseous fluid in contact with said diaphragm, converting said changes of pressure into mechanical vibrations of a second diaphragm, and transferring said mechanical vibrations to a relatively large diaphragm.

8. The method of generating sound waves of relatively large volume which includes producing variations of pressure in conformity with the periodicity of the sound waves to be reproduced, transmitting said variations of pressure through a gaseous fluid to a motor wherein said changes of pressure are converted into mechanical vibrations of substantially the same amplitude as the initial variations of pressure, and mechanically transmitting the converted vibrations to a relatively large diaphragm.

9. The method of generating sound waves of relatively large volume which includes producing variations of pressure in a fluid column in conformity with the periodicity of the sound waves to be reproduced, transmitting said variations of pressure to a motor wherein said changes of pressure are converted into mechanical vibrations, and mechanically transmitting the converted vibrations with decreased amplitude and increased force to a relatively large diaphragm.

10. The method of generating sound waves of relatively large volume which includes producing variations of pressure in conformity with the periodicity of the sound waves to be reproduced, transmitting said variations of pressure through a static column of gaseous fluid to a motor wherein said changes of pressure are converted into mechanical vibrations, and mechanically transmitting the converted vibrations to a relatively large diaphragm.

11. The method of generating sound waves of relatively large volume which includes vibrating a diaphragm in conformity with the periodicity of the sound waves to be reproduced, creating changes of pressure in a column of fluid by the vibration of said diaphragm, transmitting said generated pressures without substantial change of amplitude to a second diaphragm, and transmitting the vibrations induced in said second diaphragm to a diaphragm of relatively large area.

12. The method of generating sound waves of relatively large volume which includes vibrating a diaphragm to create variations of pressure in a column of fluid in contact therewith, transmitting said changes of pressure in said fluid column to a second diaphragm to produce therein vibrations of substantially the same amplitude as those of the first diaphragm, and converting the vibrations of said second diaphragm into vibrations of a relatively large diaphragm adapted to generate sound waves of the desired volume without further amplification.

13. The method of generating sound waves of relatively large volume which includes vibrating a diaphragm to create variations of pressure in a column of gaseous fluid in contact therewith, transmitting said changes of pressure in said fluid column without substantial change of amplitude to a second diaphragm, and mechanically transmitting the vibrations of said second diaphragm with decreased amplitude and increased force to a relatively large diaphragm.

14. The method of generating sound waves of relatively large volume which includes vibrating a diaphragm to create variations of pressure in a fluid column, transmitting said changes of pressure without substantial change in amplitude to a second diaphragm, and mechanically transmitting the vibrations of said second diaphragm to a relatively large diaphragm.

15. The method of generating sound waves of relatively large volume which includes vibrating a diaphragm to create variations of pressure in a column of gaseous fluid, transmitting said changes of pressure without substantial change in amplitude to a second diaphragm, and mechanically transmitting the vibrations of said second diaphragm to a relatively large diaphragm adapted to generate sound waves of the desired volume without further amplification.

16. In sound reproducing apparatus, the combination of a diaphragm, a second diaphragm, means providing a column of gaseous fluid extending between said diaphragms, a diaphragm large relative to said first two diaphragms, and a mechanical connection between said second and said large diaphragm.

17. In sound reproducing apparatus, the combination of a diaphragm, a second diaphragm, means providing a relatively long column of gaseous fluid of relatively small cross section extending between said diaphragms, a relatively large diaphragm, and a mechanical connection between said second and said large diaphragms.

18. In sound reproducing apparatus, the combination of a diaphragm, a second diaphragm, means providing a column of fluid extending between said diaphragms, a relatively large diaphragm, and a lever connection between said second and said large diaphragms.

19. In sound reproducing apparatus, the combination of a diaphragm, a second diaphragm, means providing a column of fluid extending between said diaphragms, a relatively large diaphragm, and a lever connection between said second and said large diaphragms adapted to transmit vibrations of decreased amplitude and increased force to said large diaphragm.

20. In sound reproducing apparatus, the combination of a diaphragm, means providing a column of fluid in contact with said diaphragm, a second diaphragm having the same area exposed to said fluid column as said first diaphragm, and a relatively large diaphragm vibrated by said second diaphragm.

21. In sound reproducing apparatus, the combination of a diaphragm, means providing a column of fluid in contact with said diaphragm, a second diaphragm having the same area exposed to said fluid column as said first diaphragm, and a relatively large diaphragm connected to said second diaphragm.

22. In sound reproducing apparatus, the combination of a diaphragm, means providing a column of fluid in contact with said diaphragm, a second diaphragm having the same area exposed to said fluid column as said first diaphragm, a relatively large diaphragm, and a lever connection between said second and said large diaphragms.

23. In sound reproducing apparatus, the combination of a diaphragm, means providing a column of fluid in contact with said diaphragm, a second diaphragm having the same area exposed to said fluid column as said first diaphragm, a relatively large diaphragm, and a lever of the second order between said second and said large diaphragms.

24. In sound reproducing apparatus, means for producing in a static column of gaseous fluid variations of pressure in conformity with sound vibrations, means in operative relation to said column of fluid for converting the pressure changes in said column into mechanical vibrations, a relatively large diaphragm adapted to generate sounds of the desired volume without further amplification, and means for transferring said mechanical vibrations to said large diaphragm.

25. In sound reproducing apparatus, means for producing in a static column of fluid variations of pressure in accordance with sound vibrations, means in operative relation to said column of fluid for converting the pressure changes in said column into mechanical vibrations, a relatively large diaphragm, and means for transferring said mechanical vibrations to said large diaphragm with decreased amplitude and increased force.

26. In sound reproducing apparatus, means for producing in a static column of fluid variations of pressure in accordance with sound vibrations, means exposed to said column of fluid and adapted to be vibrated thereby with substantially the same amplitude as said first-named means, a relatively large diaphragm, and a lever for transferring the vibrations of said last-named means to said large diaphragm.

27. In sound reproducing apparatus, the combination of a diaphragm, means for vibrating said diaphragm in conformity with sound waves, means providing a relatively long column of gaseous fluid for transmitting variations of pressure produced by the vibrations of said diaphragm, a second diaphragm vibrated by the changes in pressure in said fluid column, and a relatively large diaphragm connected to said second diaphragm.

28. In sound reproducing apparatus, the combination of a diaphragm, means for vibrating said diaphragm in conformity with sound waves, means providing a relatively long fluid column of substantially uniform cross section for transmitting variations of pressure produced by the vibrations of said diaphragm, a second diaphragm of substantially the same effective area as said first diaphragm and vibrated by the changes in pressure in said fluid column, and a relatively large diaphragm connected to said second diaphragm.

29. In sound reproducing apparatus, the combination of a diaphragm, means for vibrating said diaphragm in conformity with sound waves, means providing a column of gaseous fluid for transmitting variations of pressure in conformity with the frequency and amplitude of the vibrations of said diaphragm, a second diaphragm vibrated by the changes of pressure in said fluid column, and a diaphragm large relative to said first two diaphragms and vibrated by said second diaphragm.

30. In sound reproducing apparatus, the combination of a diaphragm, means for vibrating said diaphragm in conformity with sound waves, means providing a column of fluid for transmitting variations of pressure in conformity with the frequency and amplitude of the vibrations of said diaphragm, a second diaphragm vibrated with substantially the same amplitude as said first diaphragm by the changes of pressure in said fluid column, and a relatively large diaphragm vibrated by said second diaphragm.

31. In sound reproducing apparatus, the combination of a diaphragm, means for vibrating said diaphragm in conformity with sound waves, means providing a column of gaseous fluid for transmitting variations of pressure, a second diaphragm of substantially the same area as said first diaphragm vibrated by the changes of pressure in said fluid column, and a relatively large diaphragm vibrated by said second diaphragm.

32. In sound reproducing apparatus, the combination of a diaphragm, means for vibrating said diaphragm in conformity with sound waves, means providing a column of gaseous fluid for transmitting variations of pressure in conformity with the vibrations of said diaphragm, a second diaphragm vibrated by the changes of pressure in said fluid, a relatively large diaphragm, and a lever between said second diaphragm and said large diaphragm.

33. In sound reproducing apparatus, the combination of a diaphragm, means for vibrating said diaphragm in conformity with sound waves, means providing a column of gaseous fluid for transmitting variations of pressure in conformity with the vibrations of said diaphragm, a second diaphragm vibrated by the changes of pressure in said fluid column, a relatively large diaphragm, and means for transmitting the vibrations of said second diaphragm to said large diaphragm with decreased amplitude and increased force.

34. In sound reproducing apparatus, the combination of a diaphragm, means for vibrating said diaphragm in conformity with sound waves, means providing a column of gaseous fluid for transmitting variations of pressure in conformity with the vibrations of said diaphragm, a second diaphragm of substantially the same size as said first diaphragm and vibrated by the changes of pressure in said fluid column, a relatively large diaphragm, and means for transmitting the vibrations of said second diaphragm to said large diaphragm with decreased amplitude and increased force.

35. In sound reproducing apparatus, means for producing in a static column of fluid variations of pressure in accordance with sound vibrations, means in operative relation to said column of fluid for converting the pressure changes in said column into mechanical vibrations, a relatively large diaphragm adapted to generate sounds of the desired volume without further amplification, and means for transmitting said mechanical vibrations to said large diaphragm.

36. In sound reproducing apparatus, the combination of a diaphragm, means for vibrating said diaphragm in conformity with sound waves, means providing a column of gaseous fluid for transmitting variations in pressure in conformity with the vibrations of said diaphragm, a second diaphragm of substantially the same effective area as said first diaphragm and vibrated by the changes of pressure in said fluid column, a relatively large diaphragm adapted to generate sound waves of the desired volume without further amplification, and a lever between said second diaphragm and said large diaphragm.

37. In sound reproducing apparatus, the combination of a diaphragm, means for vibrating said diaphragm in conformity with sound waves, means providing a relatively long fluid column of substantially uniform cross section for transmitting variations in pressure in conformity with the vibrations of said diaphragm, a second diaphragm of substantially the same effective area as said first diaphragm and vibrated by the changes of pressure in said fluid column, a relatively large diaphragm adapted to generate sound waves of the desired volume without further amplification, and a lever between said second diaphragm and said large diaphragm.

38. In sound reproducing apparatus, the combination of a diaphragm, means providing a column of fluid in contact with said diaphragm, a second diaphragm subjected to said fluid column, a relatively large diaphragm, and means between said second diaphragm and said large diaphragm whereby the total pressure on said second diaphragm is amplified and transmitted to said large diaphragm.

39. In sound reproducing apparatus, the combination of a diaphragm, means providing a column of gaseous fluid in contact with said diaphragm, a second diaphragm subjected to said fluid column, said fluid column and second diaphragm being adapted to transmit changes of pressure without amplification, a relatively large diaphragm, and a connection between said second diaphragm and said large diaphragm adapted to amplify the total pressure acting on said second diaphragm.

40. In sound reproducing apparatus, the combination of a diaphragm, means for vibrating said diaphragm in conformity with sound waves, means providing a column of gaseous fluid for transmitting variations of pressure, said means being provided with bends to prevent undesirable differences in accentuation of notes by the action of said column, a second diaphragm vibrated by the changes of pressure in said fluid column, and a relatively large diaphragm connected to said second diaphragm.

41. In sound reproducing apparatus, the combination of a diaphragm, means for vibrating said diaphragm in conformity with sound waves, means providing a relatively long column of gaseous fluid of relatively small cross section for transmitting variations of pressure, a second diaphragm in contact with said fluid column and having substantially the same area exposed to said fluid column as said first diaphragm, and a relatively large diaphragm vibrated by said second diaphragm.

42. In a sound reproducing machine, in combination with a record support, a diaphragm, means for vibrating said diaphragm from a record on said support, means providing a relatively long column of gaseous fluid in contact with said diaphragm, a mounting whereby said column, diaphragm and diaphragm vibrating means may traverse said record support, a second diaphragm subjected to the variations of pressure in said fluid column, and a relatively large diaphragm connected to said second diaphragm.

43. In a sound reproducing machine, in combination with a record support, a diaphragm, means for vibrating said diaphragm from a record on said support, means providing a column of gaseous fluid in contact with said diaphragm, means intermediate the length of said column providing a joint for relative movement between said diaphragm and said record support, a second diaphragm having substantially the same area in contact with said fluid column as said first diaphragm, and a relatively large diaphragm vibrated by said second diaphragm.

44. In a sound reproducing machine, in combination with a record support, a diaphragm, means for vibrating said diaphragm from a record on said support, means providing a fluid column in contact with said diaphragm, a second diaphragm adapted to be vibrated by the changes of pressure in said fluid column, a cabinet for said elements, a relatively large diaphragm in the wall of said cabinet, and connections between said second diaphragm and said large diaphragm.

45. In a sound reproducing machine, in combination with a record support, a diaphragm, means for vibrating said diaphragm from a record on said support, means providing a column of gaseous fluid in contact with said diaphragm, a second diaphragm adapted to be vibrated by the changes of pressure in said fluid column, a cabinet for said elements, a relatively large diaphragm in the wall of said cabinet, and a lever between said second diaphragm and said large diaphragm.

46. In a sound reproducing machine, in combination with a record support, a diaphragm, means for vibrating said diaphragm from a record on said support, means providing a column of fluid in contact with said diaphragm, a second diaphragm adapted to be vibrated by the changes of pressure in said fluid column, a cabinet for said elements, a relatively large diaphragm in the wall of said cabinet, a connection between said second diaphragm and said large diaphragm, and a joint intermediate said large diaphragm and said first-named diaphragm whereby said first-named diaphragm may move relatively to said record support.

47. In a sound reproducing machine, in combination with a record support, a diaphragm, means for vibrating said diaphragm from a record on said support, means providing a column of fluid in contact with said diaphragm, a second diaphragm of substantially the same area as said first diaphragm and adapted to be vibrated by the changes of pressure in said fluid column, a cabinet for said elements, a relatively large diaphragm in the wall of said cabinet, a lever between said second diaphragm and said large diaphragm, and a joint between said second diaphragm and first diaphragm whereby said first diaphragm may move relatively to said record support.

48. In a machine for reproducing sound waves from a record of the same, a vibratile diaphragm of large area supported at its periphery and freely exposed to unconfined air, and means including a fluid column transmission device through which the vibrations produced by the record are transmitted to the diaphragm, the diaphragm being of sufficient area to impart to the surrounding free air sound waves substantially corresponding in volume to the recorded sound waves.

49. In a sound regenerating machine, a vibratile diaphragm of large area supported at its periphery and freely exposed to unconfined air, a sound-vibrated element, and means including a fluid column transmission means connecting said element and said diaphragm and arranged to impart to the diaphragm vibrations which are of less amplitude than the vibrations imparted to said element.

50. In a sound regenerating machine, a vibratile diaphragm supported at its periphery and freely exposed to unconfined air, a sound-vibrated element, and means including a fluid column transmission means connecting said element and said diaphragm and arranged to impart to said diaphragm vibrations which are of less amplitude than the vibrations imparted to said element, said diaphragm having an area sufficiently large to produce, without further amplification, sound waves of large volume and carrying power.

51. In a sound reproducing machine, in combination with a record support, a diaphragm, means for vibrating said diaphragm from a record on said support, means providing a relatively long column of gaseous fluid in contact with said diaphragm, means intermediate the length of said column providing a joint for movement of said diaphragm toward and away from said support, a second diaphragm subjected to the variations of pressure in said fluid column, and a relatively large diaphragm connected to said second diaphragm.

52. In a sound reproducing machine, in combination with a record support, a diaphragm, means for vibrating said diaphragm from a record on said support, means providing a relatively long column of gaseous fluid in contact with said diaphragm, a second diaphragm of substantially the same effective area as said first diaphragm and subjected to the variations of pressure in said fluid column, a relatively large diaphragm connected to said second diaphragm, and a joint in said fluid column intermediate said first and said second diaphragms.

In testimony whereof I have signed this specification.

WILLIAM D. LA RUE.